US010038459B2

(12) United States Patent
Mori et al.

(10) Patent No.: US 10,038,459 B2
(45) Date of Patent: Jul. 31, 2018

(54) NETWORK CONTROL DEVICE (71) Applicants: NIPPON SOKEN, INC., Nishio, Aichi-pref. (JP); DENSO CORPORATION, Kariya, Aichi-pref. (JP)

(72) Inventors: Hiroyuki Mori, Nishio (JP); Youhei Sekiya, Nishio (JP); Yoshifumi Kaku, Kariya (JP); Shogo Akasaki, Kariya (JP)

(73) Assignees: NIPPON SOKEN, INC., Nishio (JP); DENSO CORPORATION, Kariya (JP)

( * ) Notice: Subject to any disclaimer, the term of this patent is extended or adjusted under 35 U.S.C. 154(b) by 83 days.

(21) Appl. No.: 15/098,439

(22) Filed: Apr. 14, 2016

(65) Prior Publication Data

US 2016/0306409 A1 Oct. 20, 2016

(30) Foreign Application Priority Data

Apr. 16, 2015 (JP) .................................. 2015-084311

(51) Int. Cl.
*G06F 1/32* (2006.01)
*H04B 1/04* (2006.01)
(Continued)

(52) U.S. Cl.
CPC ............... *H04B 1/04* (2013.01); *H04L 12/10* (2013.01); *H04W 52/0216* (2013.01);
(Continued)

(58) Field of Classification Search
CPC .................................. H04B 1/04; H04L 12/10
(Continued)

(56) References Cited

U.S. PATENT DOCUMENTS 6,016,549 A * 1/2000 Matsushiba ........... G06F 1/3203
710/8
8,391,420 B1 * 3/2013 An ...................... H04L 25/0272
322/20
(Continued)

FOREIGN PATENT DOCUMENTS

JP 2004-254043 A 9/2004
JP 2014-80166 A 5/2014
(Continued)

*Primary Examiner* — Jaweed A Abbaszadeh
*Assistant Examiner* — Volvick Derose
(74) *Attorney, Agent, or Firm* — Posz Law Group, PLC (57) ABSTRACT A network control device includes a communicator performing communications via a transmission line at a preset transmission speed in a wake-up mode, a low frequency attenuator attenuating a low frequency component in a transmission signal having a low transmission speed that is lower than the preset transmission speed at a position between the transmission line and the communicator to receive and transmit the transmission signal to and from the communicator, and a wake-up controller receiving and transmitting a wake-up signal for transitioning from a sleep mode to the wake-up mode, at a transmission line side position of the low frequency attenuator, where the wake-up signal at a low frequency band is subject to attenuation by the low frequency attenuator, for a selective wake-up of a network node via the transmission line for network communications.

10 Claims, 9 Drawing Sheets (51) Int. Cl.
  *H04L 12/10*   (2006.01)
  *H04W 52/02*   (2009.01)
  *H04L 27/12*   (2006.01)

(52) U.S. Cl.
  CPC ... *H04W 52/0219* (2013.01); *H04W 52/0229* (2013.01); *G06F 1/3203* (2013.01); *H04L 27/12* (2013.01); *Y02D 70/00* (2018.01)

(58) Field of Classification Search
  USPC .................................................. 713/323
  See application file for complete search history.

(56) References Cited

U.S. PATENT DOCUMENTS

| | | | | | |
|---|---|---|---|---|---|
| 2002/0169009 | A1* | 11/2002 | Reiner | .............. | H04M 1/72508 455/574 |
| 2005/0237160 | A1* | 10/2005 | Nolan | ................ | G06K 19/0705 340/10.33 |
| 2010/0279745 | A1* | 11/2010 | Westcott | ........... | H04W 52/0274 455/574 |
| 2012/0079302 | A1* | 3/2012 | Ise | ........................ | G06F 1/3209 713/323 |
| 2012/0119799 | A1* | 5/2012 | Liu | ........................ | G01R 23/15 327/142 |
| 2012/0327942 | A1* | 12/2012 | Terabe | .................... | H04L 12/12 370/400 |
| 2013/0219204 | A1* | 8/2013 | Chen | ..................... | H04M 1/738 713/323 |
| 2015/0011171 | A1* | 1/2015 | Akbari-Dilmaghani | | G06K 7/0008 455/249.1 |
| 2015/0071151 | A1* | 3/2015 | Bradley | ............ | H04W 52/0235 370/311 |
| 2015/0185759 | A1* | 7/2015 | Hinderer | ................... | G06F 1/12 713/400 |
| 2016/0007288 | A1* | 1/2016 | Samardzija | ....... | H04W 52/0229 370/311 |

FOREIGN PATENT DOCUMENTS

JP   2014-104937 A   6/2014
WO   WO 2012010676 A1 *   1/2012   ........... H04B 13/005

* cited by examiner

NETWORK CONTROL DEVICE

CROSS REFERENCE TO RELATED APPLICATION

The present application is based on and claims the benefit of priority of Japanese Patent Application No. 2015-084311, filed on Apr. 16, 2015, the disclosure of which is incorporated herein by reference.

TECHNICAL FIELD

The present disclosure generally relates to a technique for an individual wake-up control of a network node.

BACKGROUND INFORMATION

Conventionally, as a control of a node in the communications system, an operation mode of the node is switched (i.e., transitions) to a sleep mode in which functions of the node is somewhat restricted upon determining a fulfillment of a preset sleep condition, for a power saving of an entire communications system.

According to a disclosure in a patent document, JP 2014-104937 A (patent document 1), in each of the nodes of such a system, a power supply to a microcomputer that controls a driver and/or communications is stopped, and a state of a transmission line is monitored (by a controller) in the sleep mode.

When a signal transmission on the transmission line is detected by the controller, the power supply to the driver and/or the microcomputer is resumed, for the transition to a wake-up mode.

In such a technique of the communications system, when one of the network node outputs a signal to the transmission line in the sleep mode, all nodes transition to the wake-up mode. Therefore, selectively waking-up only the required nodes is not performable by such a technique, and communications involving only limited number of nodes wake up all the nodes in the system, thereby diminishing the power consumption reduction effect of the sleep mode.

SUMMARY

It is an object of the present disclosure to provide a technology of waking up network nodes selectively in a communications system via a communications transmission line.

In an aspect of the present disclosure, a network control device, which serves as a network component (i.e., as a network node), together with a transmission line, selectively operates in a wake-up mode and in a sleep mode, for a low power operation.

Further, the network control device of the present disclosure is provided with a communicator, a low frequency attenuator, and a wake-up controller. The communicator performs communications at a preset transmission speed via the transmission line in the wake-up mode. The low frequency attenuator attenuates a low frequency component in a transmission signal having a low transmission speed lower than the preset transmission speed, and the low frequency attenuator is connected at a position between the transmission line and the communicator to receive and transmit the transmission signal to and from the communicator. The wake-up controller receives and transmits a wake-up signal for a transition from the sleep mode to the wake-up mode, and the wake-up controller is connected to the low frequency attenuator at a transmission line side position of the low frequency attenuator, where the wake-up signal at a low frequency band is subject to attenuation by the low frequency attenuator to transmit the wake-up signal.

According to the above-described configuration, the transmission of the wake-up signal is performable via the transmission line without affecting an operation of the communicator, because the wake-up signal is transmitted and received in the low frequency band that is subject to attenuation by the low frequency attenuator.

As a result, in a network system using the above-described network control devices of the present disclosure, only desired nodes are selectively woken up by adding target wake-up node information to the wake-up signal, thereby increasing the power consumption reduction effect of the sleep mode.

The number in the parenthesis of the claims represents a relationship between the claim element and the device in the embodiment, and does not the technical scope of the claim element in any manner.

BRIEF DESCRIPTION OF THE DRAWINGS

Objects, features, and advantages of the present disclosure will become more apparent from the following detailed description made with reference to the accompanying drawings, in which.

DETAILED DESCRIPTION

An embodiment to which the present disclosure is applied is described using the drawings.

[1. First Embodiment]

[1.1. Configuration]

Figure 1:
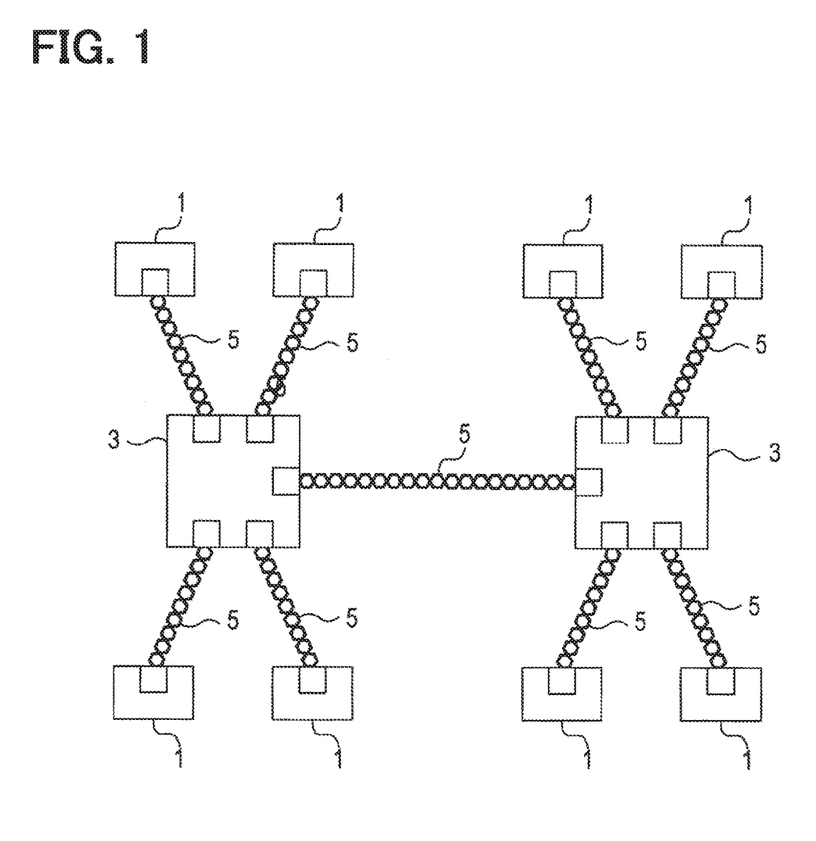
FIG. 1 is an illustration of a configuration of an in-vehicle network system.

As shown in FIG. 1, an in-vehicle network system is provided with a network control device 1, a repeater 3, and a transmission line 5. The network system realizes a high speed communication (e.g., 100 Mbps) between the network control devices 1 via the repeater 3 and the transmission line 5 according to the Ethernet (i.e., registered trademark) standard.

The Repeater 3 may be a well-known device in the art that distributes the signal received by one port to all the other ports in the device, for an output to the other device. Each of the ports in the device is connected to another network control device 1, or to the repeater 3 via the transmission line 5. The transmission line 5 may be a well-known twisted pair wires, and transmits a differential signal outputted from the network control device 1 in this case. That is, the transmission line 5 serves as the "transmission line" together with the repeater 3.

The network control device 1 functions as a communication node, and is provided as an Electronic Control Unit (ECU) that performs various processing using information transmitted and received via the transmission line 5.

Figure 2:
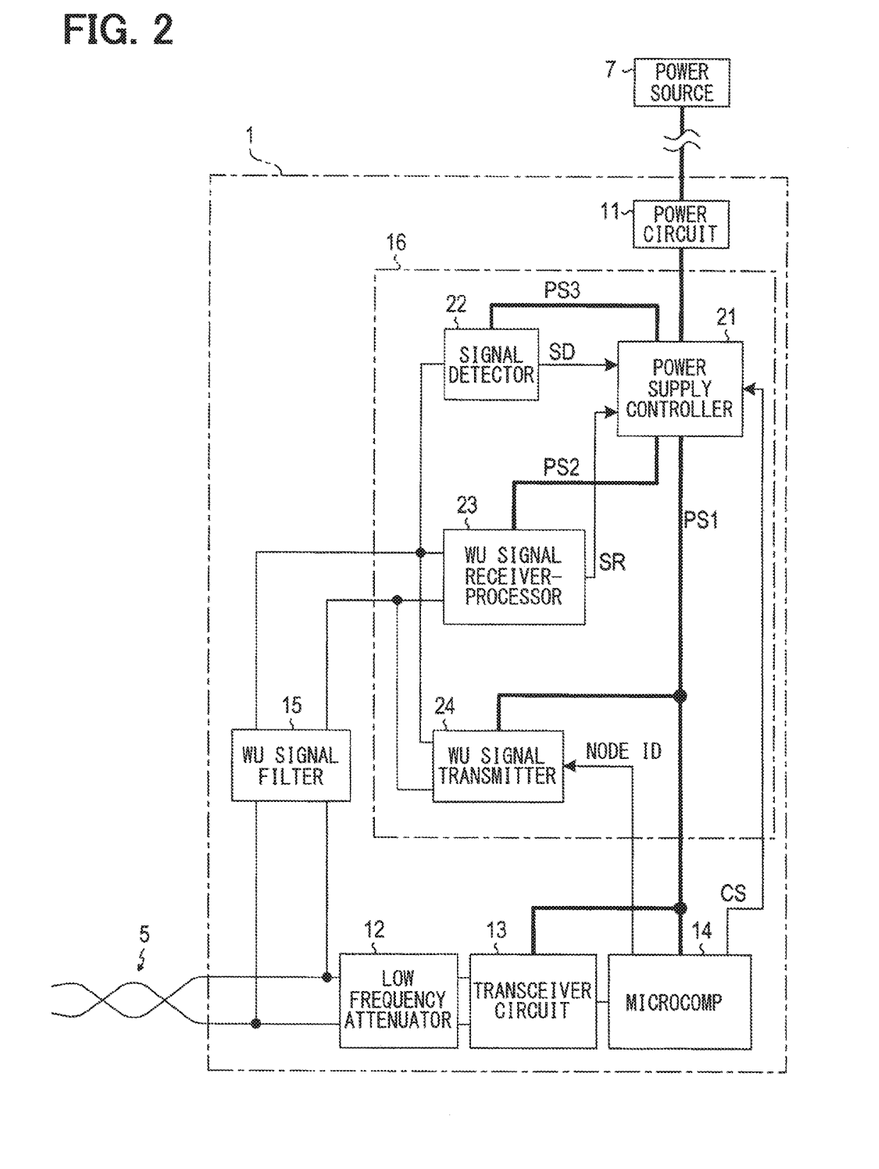
FIG. 2 is a block diagram of a network control device.

The network control device 1 is provided with a power circuit 11, a low frequency attenuator 12, a transceiver circuit 13, a microcomputer 14, a wake-up (WU) signal filter 15, and a WU controller 16 as shown in FIG. 2.

The power circuit 11 receives a power supply from a power source 7 (i.e., from an in-vehicle battery), changes a power supply voltage to a preset voltage suitable for an operation of the network control device 1, and supplies the voltage to each of the components via the WU controller 16.

The low frequency attenuator 12 consists of a coupling capacitor or a pulse transformer, attenuates a low-frequency component of the signal on the transmission line 5 before supplying the signal to the transceiver circuit 13. The low frequency attenuator 12 is a well-known device installed and used to cut a direct-current component that causes malfunction in a high-speed communication.

The transceiver circuit 13 codes transmission data outputted from the microcomputer 14 according to a predetermined communications protocol, converts it into the differential signal, and outputs the signal to the transmission line 5 via the low frequency attenuator 12. Further, the transceiver circuit 13 decodes the differential signal received from the transmission line 5, and outputs the decoded signal to the microcomputer 14. Together, the transceiver circuit 13 and the microcomputer 14 may function together as a communicator.

The microcomputer 14 shares various data with the other network control devices 1 via the communications, and performs various processing for realizing the function assigned to the self device. The processes performed by the microcomputer 14 at least include (i) a node ID output process that outputs, to the WU controller 16, a node ID for an identification of a node (i.e., the network control device 1), when a preset wake-up transmission condition is fulfilled, and (ii) a sleep instruction output process that outputs, to the WU controller 16, a sleep instruction CS, when a preset sleep condition is fulfilled.

The WU signal filter 15 may be a low-pass filter that at least passes a signal at a frequency for transmitting and receiving the WU signal among signals at a low frequency band (e.g., frequencies equal to or below 100 kHz), which are Do then attenuated by the low frequency attenuator 12. The WU signal filter 15 is also connected at a position between the transmission line 5 and the WU controller 16 (i.e., connected on a transmission line 5 side of the low frequency attenuator 12).

The WU controller 16 is provided with a power supply controller 21, a signal detector 22, a WU signal receiver-processor 23, and a WU signal transmitter 24.

The signal detector 22 operates by receiving a power supply output PS3 from the power supply controller 21, and outputs a signal detection result SD based on the output of the WU signal filter 15.

The power supply controller 21 operates by receiving a power supply output from the power circuit 11, and controls the power supply to the other devices according to (i) the signal detection result SD by the signal detector 22, (ii) a WU requisite determination result SR by the WU signal receiver-processor 23, and (iii) the sleep instruction CS from the microcomputer 14.

From among power supply outputs PS1, PS2, PS3 respectively controlled by the power supply controller 21, a power supply output PS1 is supplied to the transceiver circuit 13, to the microcomputer 14, and to the WU signal transmitter 24, and a power supply output PS2 is supplied to the WU signal receiver-processor 23, and the power supply output PS3 is supplied to the signal detector 22.

Figure 3:
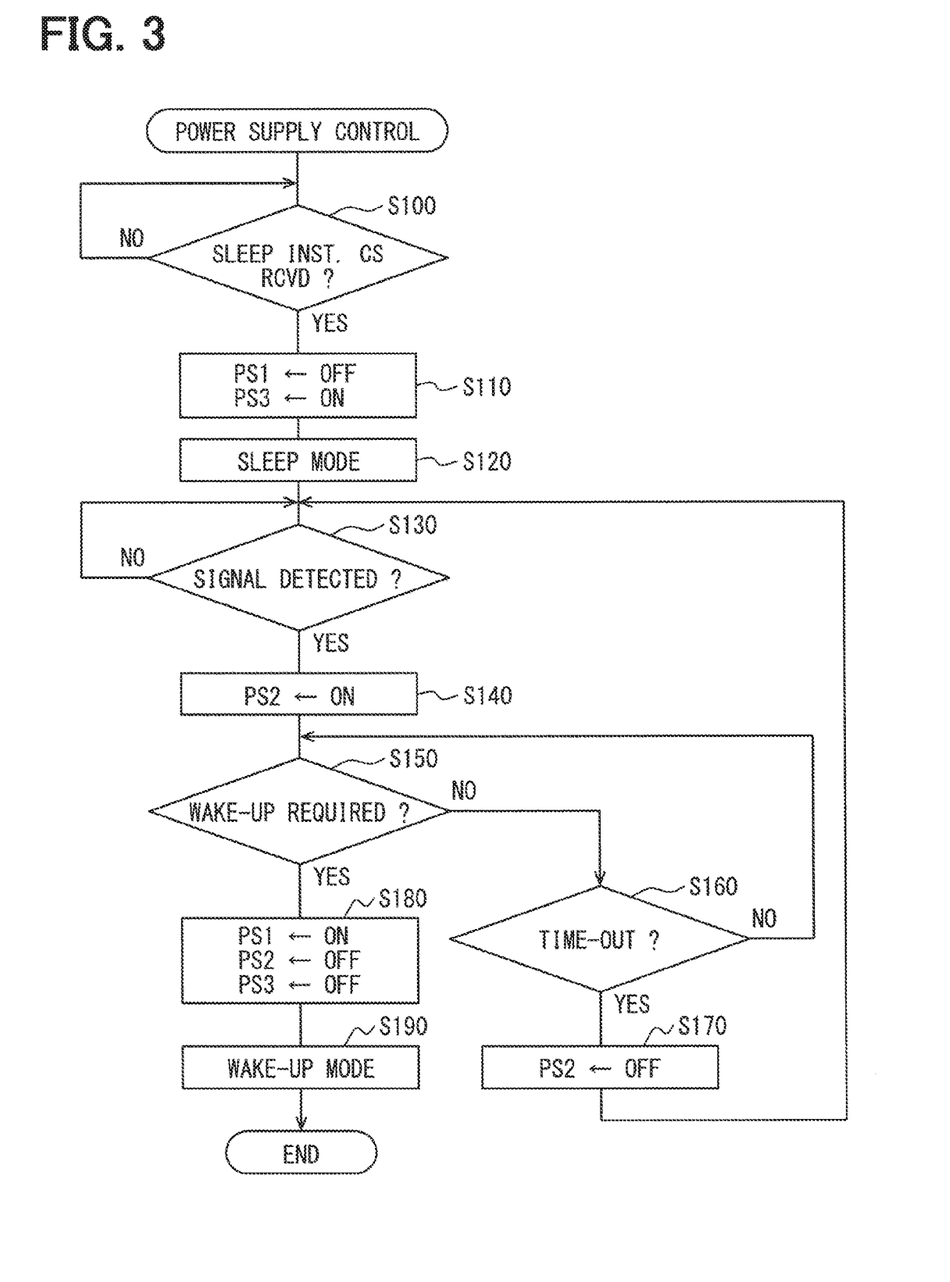
FIG. 3 is a flowchart of an operation of a power supply controller.

Here, an operation of the power supply controller 21 is described with reference to FIG. 3.

The power supply controller 21 switches OFF the power supply output PS1 and switches ON the power supply output PS3 (S110), when the controller 21 receives the sleep instruction CS in the wake-up mode (S100), for a transition of an operation mode to the sleep mode (S120). Then, the controller 21 waits until a signal is detected by the signal detector 22 (S130). When a signal is detected, the controller 21 switches ON the power supply output PS2, for starting an operation of the WU signal receiver-processor 23 (S140).

Then, the controller 21 waits until a requisite of a wake-up is determined by the WU signal receiver-processor 23 (S150-YES) or until a time-out, which is a lapse of preset period of time, after the detection of a signal by the signal detector 22 (S150-NO and S160-NO).

When it is determined that a wake-up is required (S150-YES), the controller 21 switches ON the power supply output PS1, switches OFF the power supply output PS2, and switches OFF the power supply output PS3 (S180), for a transition to the wake-up mode (S190).

On the other hand, when it is determined as a time-out (S160-YES), the controller 21 switches OFF the power supply output PS2 (S170), and returns the process to S130.

Now resuming the description of a flowchart of FIG. 2, when a target node ID for the wake-up is supplied to the WU signal transmitter 24 from the microcomputer 14, the WU signal transmitter 24 transmits the WU signal having a node ID set in the WU signal transmitter 24 to the transmission line 5 via the WU signal filter 15. The WU signal is made up from two parts, that is, (i) a start hit (i.e., a bit for detecting a reception of a signal), showing a start of a signal by a logical value of 1, and (ii) a data area with plural bits, which represents a node ID in a binary number. The WU signal is transmitted at a transmission speed of several kbps to several hundred kbps.

The signal detector 22 outputs the signal detection result SD to the power supply controller 21 as a result of detection of a signal when a signal supplied via the WU signal filter 15 (i.e., a signal in a frequency band that is used for transmission of the WU signal) changes by an amount greater than a preset level.

The WU signal receiver-processor 23 outputs, to the power supply controller 21, the determination result SR, which represents that the wake-up, is required when receiving the wake-up signal having a node ID of the self device set within the self device from the transmission line 5 via the WU signal filter 15.

Figure 4:
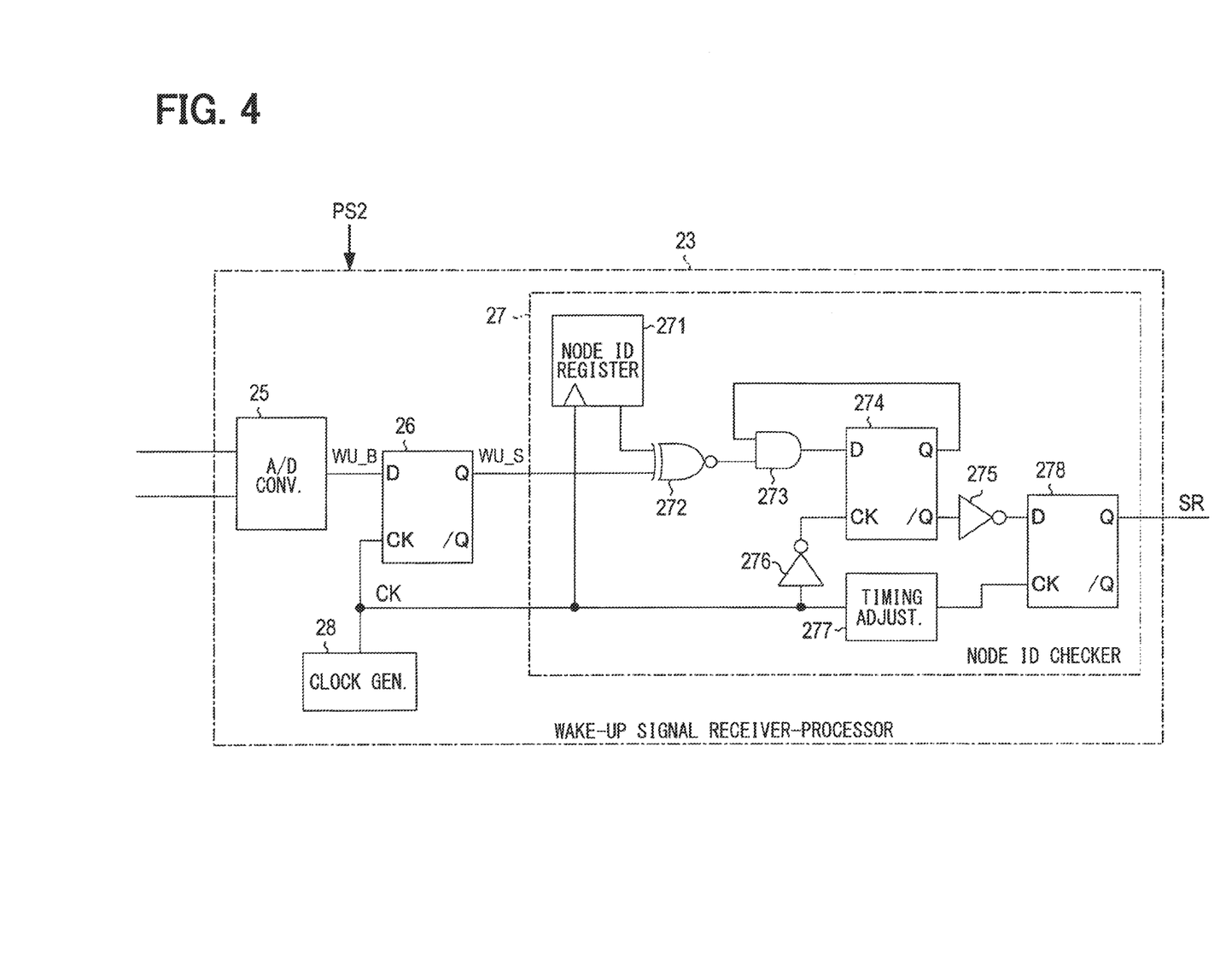
FIG. 4 is a block diagram of a wake-up signal receiver-processor.

The WU signal receiver-processor 23 has an Analog-to-Digital (A/D) converter 25, a sampler 26, a node ID checker 27, and a clock generator 28, as shown in FIG. 4.

The clock generator 28 generates a clock CK, which has the same bit cycle as the WU signal. The AID converter 25 is a well-known differential amplifier, and outputs a signal WU_B that has an amplified signal level based on the received differential signal.

The sampler 26 is a well-known flip-flop (FF) circuit, and outputs a signal WU_S that is sampled from the signal WU_B by a rising edge of the clock CK.

The node ID checker 27 is provided with a node ID register 271 (i.e., an identification information storage), a Not Exclusive OR (NXOR) circuit 272, a logical product (AND) circuit 273, FF circuits 274, 278, negative (NOT) circuits 275, 276, and a timing adjuster 277.

The node ID register 271 stores (i.e., memorizes) data that has a signal level of a bit for detecting a reception of a signal added to a top of the node ID for identifying the self node, and reads the stored data, one bit by one bit, at a timing of the rising edge of the clock CK.

The NXOR circuit 272 outputs a high level signal or a low level signal, according to the signal WU_S from the sampler 26, and the signal from the node ID register 271. That is, when a signal level of the signal WU_S from the sampler 26, and a signal level of the signal from the node ID register 271 match with each other, the circuit 272 outputs a high level signal, and when the signal levels of the two input signals are un-match, the circuit 272 outputs a low level signal.

The AND circuit 273 outputs, by receiving an output of the NXOR circuit 272 and a non-inverted output Q of an FF circuit as the inputs, a high level signal when both of the two inputs are high levels signals.

The FF circuit 274 is put in a preset state when the power supply by the power supply output PS2 is started, and latches an output of the AND circuit 273 at a timing of a falling edge of the clock CL (i.e., at timing of a rising edge of inverted clocks that is output from the NOT circuit 276 to reverse the clock CK outputs).

The NOT circuit 275 reverses the inverted output of the FF circuit 274, for the output from the FF circuit 274.

The FF circuit 278 latches an output of the NOT circuit 275 at a timing of output from the timing adjuster 277, and outputs the latched signal as the WU requisite determination result SR. That is, when the WU requisite determination result SR is a high level signal, it indicates that the wake-up is required, and when such result SR is a low level signal, it indicates that the wake-up is not required.

The timing adjuster 277 supplies a pulse signal that is required for latching by the FF circuit 278 (i.e., latching of the signal by the rising edge of the clock CK) that is immediately after the latching of a final bit of a target WU node ID by the FF circuit 274.

Figure 5:
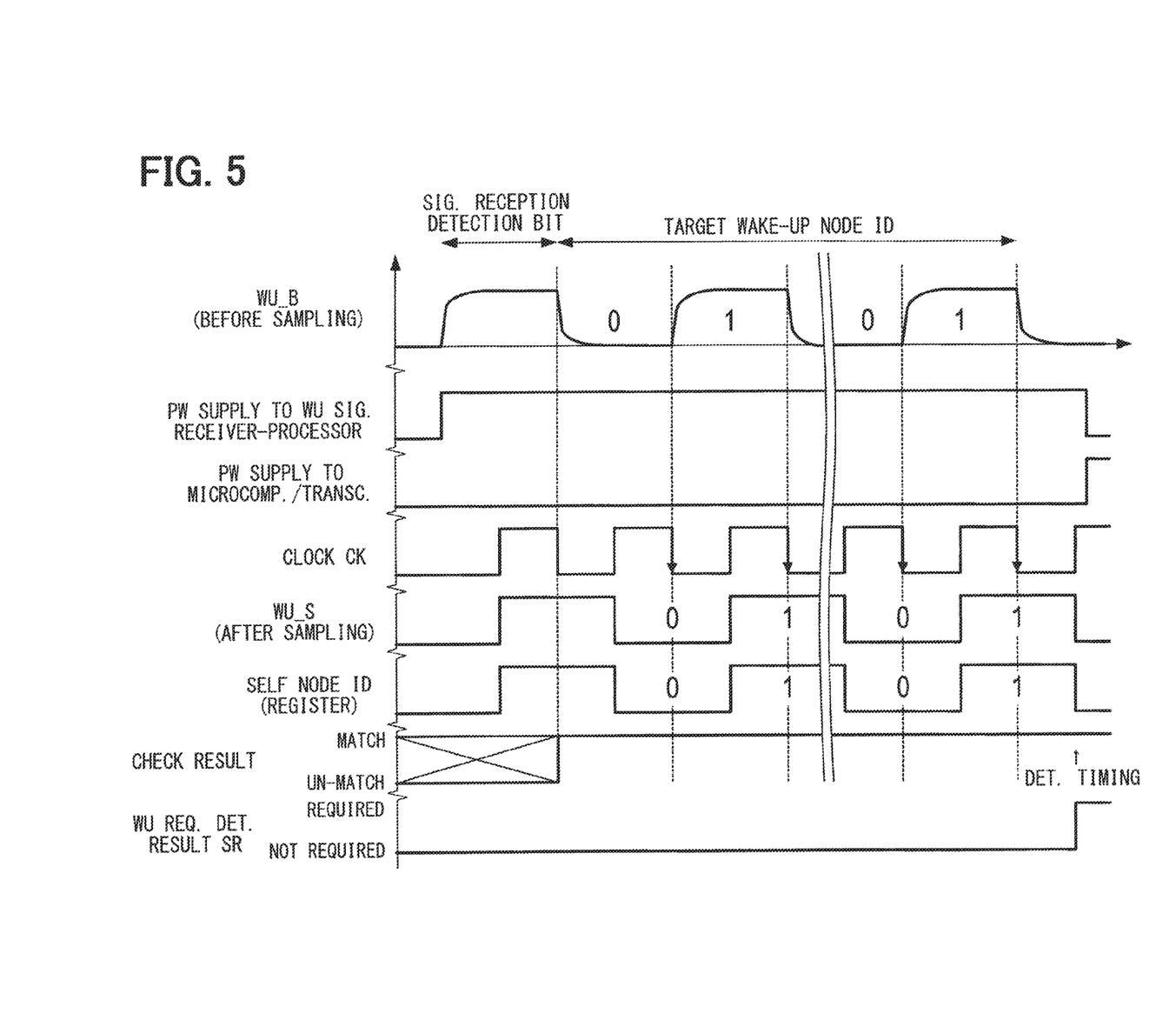
FIG. 5 is a timing chart of an operation of the wake-up signal receiver-processor (in a node ID matching case)
Figure 6:
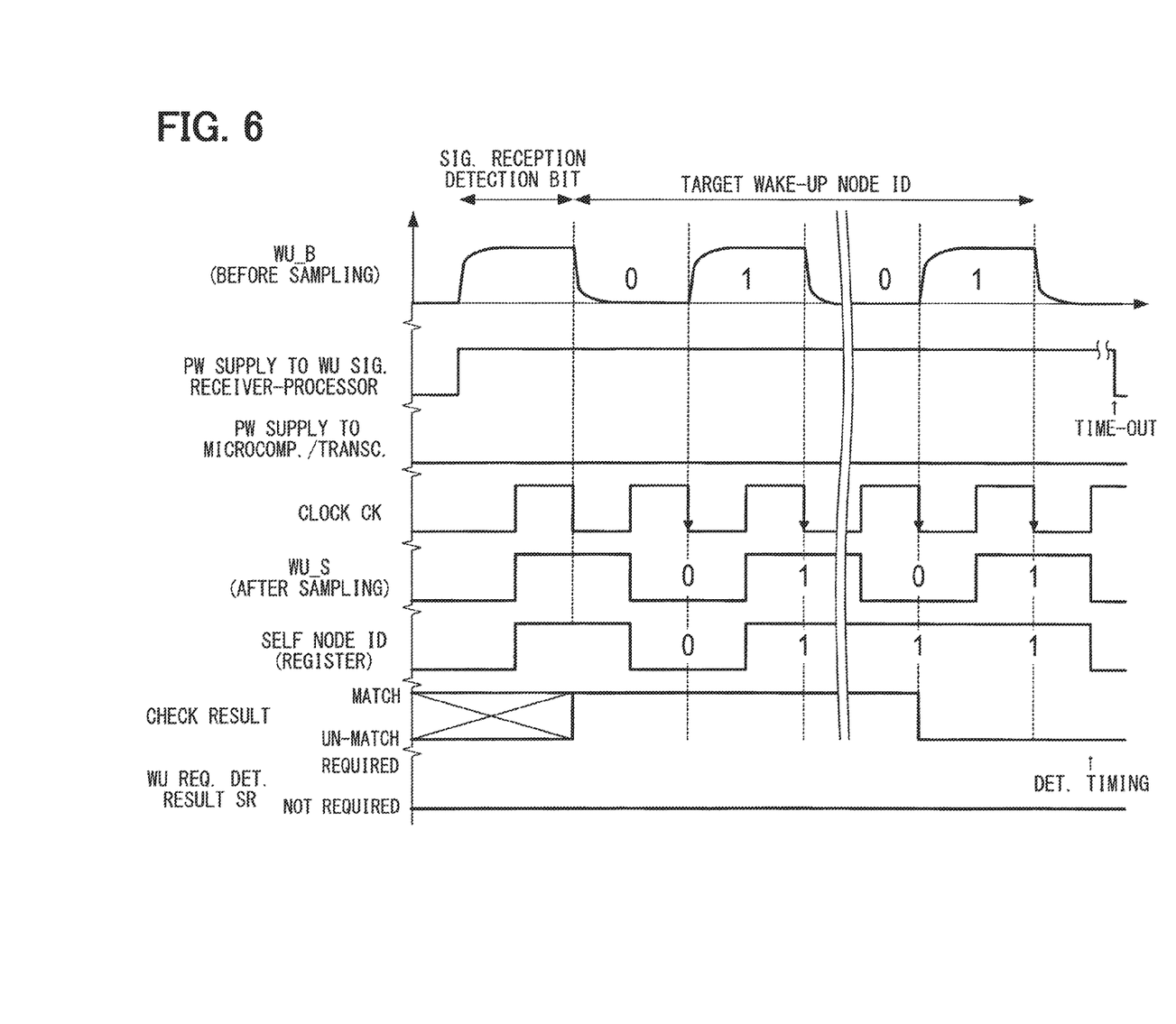
FIG. 6 is a timing chart of an operation of the wake-up signal receiver-processor (in a node ID un-matching case)

As shown in FIG. 5 and FIG. 6, the output of the FF circuit 274, which is a check result of matching between the node ID in the WU signal and the node ID of the self node is, either (i) kept at a high level while the both IDs are matching, or (ii) kept at a low level when even one bit is found to not match between the two node IDs. Therefore, at a timing after an end of checking the final bit of the node ID, the output of the FF circuit 278 performing the latch operation, (i.e., the WU requisite determination result SR), is at a high level when both IDs match (FIG. 5), or is at a low level when the IDs do not match (FIG. 6).

[1.2. Operation]

The network control device 1 having the above-described configuration stops the operation of the transceiver circuit 13, the microcomputer 14, the WU signal receiver-processor 23, and the WU signal transmitter 24 that operate by the power supply outputs PS1 and PS2, and operates only the signal detector 22 that operates by the power supply output PS3, when the operation mode is in the sleep mode. Thereby the network control device 1 is put in a low power consumption state.

When the signal detector 22 detects a signal in the frequency band used for transmission and reception of the WU signal, the power supply controller 21 starts the operation of the WU signal receiver-processor 23 by switching ON the power supply output PS2.

Then, if the WU requisite determination result SR, which shows that the wake-up is required, is obtained from the WU signal receiver-processor 23 within a preset period of time, the power supply controller 21 switches ON the power supply output PS1, switches OFF the power supply output PS2, and switches OFF the power supply output PS3, for a transition to the wake-up mode. Thereby, the transceiver circuit 13, the microcomputer 14, and the WU signal transmitter 24 operate, and the WU signal receiver-processor 23 and the signal detector 22 are put in a stop state, with a normal communication via the transmission line 5 being enabled.

If, on the other hand, a preset period of time passes without obtaining the WU requisite determination result SR, which shows that the wake-up is required after the signal detector 22 detects a signal, the power supply controller 21 switches OFF the power supply output PS2, and stops the operation of the WU signal receiver-processor 23, for continuing the sleep mode.

[1.3. Effect]

As described above, the network control device 1 transmits the wake-up signal as a signal in the frequency band that is subject to attenuation by the low frequency attenuator 12, thereby enabling an individual wake-up of the network control device 1, without blocking the usual high speed communication performed by the transceiver circuit 13 and the microcomputer 14.

In the sleep mode, not only the transceiver circuit 13 and the microcomputer 14, but also the WU signal receiver-processor 23 stop the operation, and the WU signal receiver-processor 23 is configured to operate only for a preset period of time, when the signal in the frequency band used for transmission, and reception of the WU signal by the signal detector 22 is detected, thereby further reducing the power consumption in the sleep mode.

[2. Second Embodiment]

The first and second embodiments share the same basic configuration. Therefore, the following description focuses on a difference between the embodiments.

According to the first embodiment mentioned above, a Non-Return-to-Zero (NRZ) code, which keeps a same signal level during a duration of one bit, is used as a transmission code of the WU signal.

Figure 9:
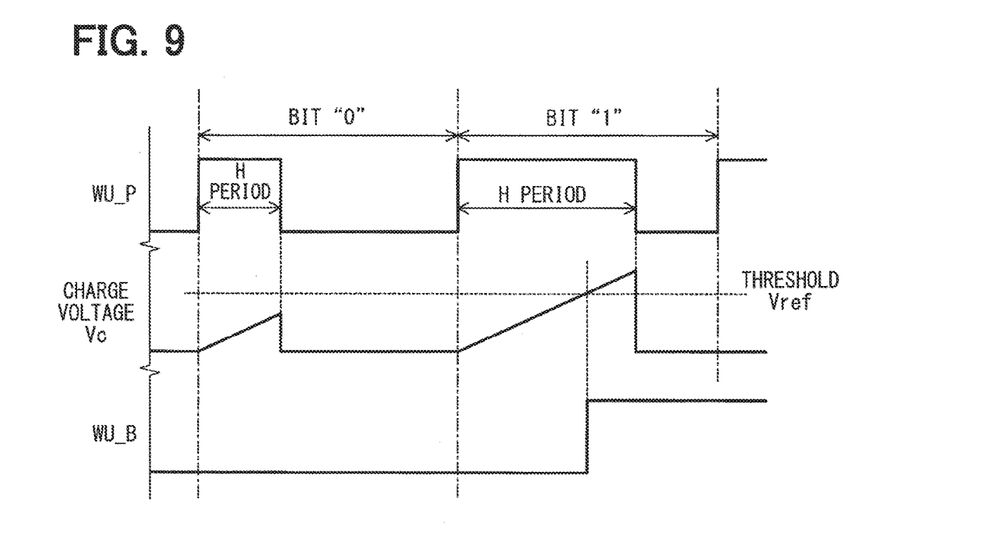
FIG. 9 is a timing chart of an operation of the demodulator.

On the other hand, in the second embodiment, a Pulse Width Modulation (PWM) code, which changes a signal level in the middle of one bit and at a bit boundary, is used. In the PWM code scheme, a signal having a shorter high level period represents a bit "0", and a signal having a longer high level period represents a bit "1", as shown in FIG. 9, in which the high level period is designated as "H PERIOD".

Figure 7:
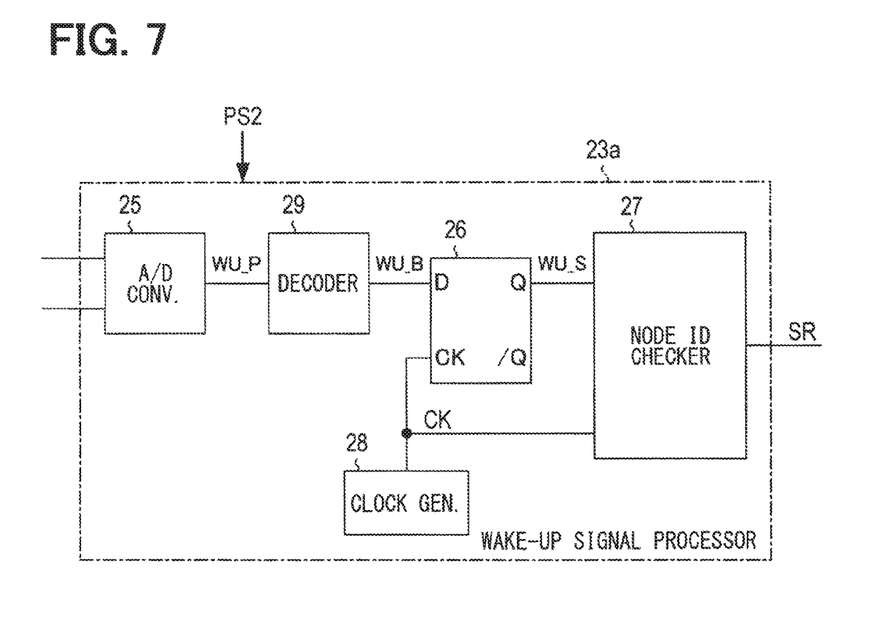
FIG. 7 is a block diagram of the wake-up signal receiver-processor in a second embodiment of the present disclosure.

According to the present embodiment, the PWM coded signal is outputted from the A/D converter 25, which is designated as a signal WU_P.

[2.1. Configuration]

A WU signal processor 23a of the present embodiment has, basically, the same configuration as the WU signal receiver-processor 23 of the first embodiment, except that a decoder 29 is inserted at a position between the A/D converter 25 and the sampler 26, as shown in FIG. 7.

Figure 8:
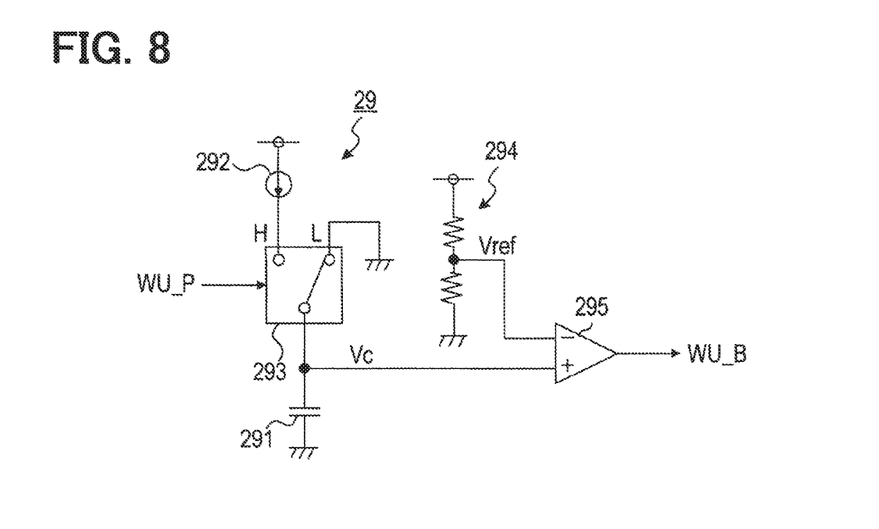
FIG. 8 is a circuit diagram of a detailed configuration of a demodulator.

The decoder 29 is provided with a capacitor 291, a constant electric current source 292, a switch 293, a voltage divider 294, and a comparator 295, as shown in FIG. 8.

The capacitor 291 has one end being grounded and other end connected to the switch 293.

The constant electric current source 292 supplies a constant current used for charging of the capacitor 291.

The switch 293 operates according to a signal level of the signal WU_P from the A/D converter 25 (i.e., the switch 293) connects a non-grounded end of the capacitor 291 to the constant electric current source 292 when the signal WU_P is a high level, and the switch 293 connects the non-grounded end of the capacitor 291 to a ground level when the signal WU_P is the low level.

The voltage divider 294 consists of a pair of resistors that divides a power source voltage, and generates a reference voltage Vref (i.e., designated as THRESHOLD Vref in FIG. 9).

The comparator 295 has an inverted input terminal and a non-inverted input terminal, and the inverted input terminal has the reference voltage Vref applied thereto, and the non-inverted input terminal has a voltage Vc, which is a voltage of the non-grounded end of the capacitor 291, or a charge voltage Vc hereafter, applied to the capacitor 291, and outputs the signal WU_B, which is in a high level, when the charge voltage Vc is lower than the reference voltage Vref, and is in a low level when the charge voltage Vc is higher than the reference voltage Vref.

In configuration, the amount of the electric current that is supplied from the constant electric current source 292, the capacity of the capacitor 291, and the magnitude of the reference voltage Vref are configured so that the charge voltage Vc exceeds the reference voltage Vref when an application of the charge voltage is continued for a preset period of time, which is defined as a longer-than high level period representing a bit "0", and a shorter-than high level period representing a bit "1", as shown in FIG. 9.

[2.2. Operation]

In the decoder 29 configured in the above-described manner, the charge voltage Vc is reset to an initial voltage of 0V when the signal WU_P is in a low level, and the charge voltage Vc increases at a constant rate while the signal WU_P is in a high level.

Then, at a time of receiving the PWM coded signal representing a bit "0", the signal WU_B outputted from the decoder 29 is in a low level, because the charge voltage Vc does not exceed the reference voltage Vref.

On the other hand, the signal WU_B is put in a high level, because the charge voltage Vc exceeds the reference voltage Vref at the time of receiving the PWM coded signal representing a bit "1".

Thereby, the signal WU_B is provided as a signal of the NRZ coding, which is decoded from the PWM coded signal.

The operation after the sampler 26, which samples the signal WU_B, is the same as that of the first embodiment.

[2.3. Effect]

According to the second embodiment described in full details above, the same effects as the first embodiment mentioned above are achievable.

[3. Third Embodiment]

The first and third embodiments share the same basic configuration. Therefore, the following description focuses on a difference between the embodiments.

According to the first embodiment mentioned above, the non-return-to-zero code that keeps the same signal level during a duration of one bit is used as a transmission code of the WU signal.

On the other hand, in the third embodiment, the pulse width modulation coding is used just like the second embodiment. However, a duty ratio of the PWM coded signal representing a bit "0" is set to be smaller than 0.5 (e.g., about 0.3 or so), and a duty ratio of the PWM coded signal representing a bit "1" is set to be greater than 0.5 (e.g., about 0.7 or so).

[3.1. Configuration]

Figure 10:
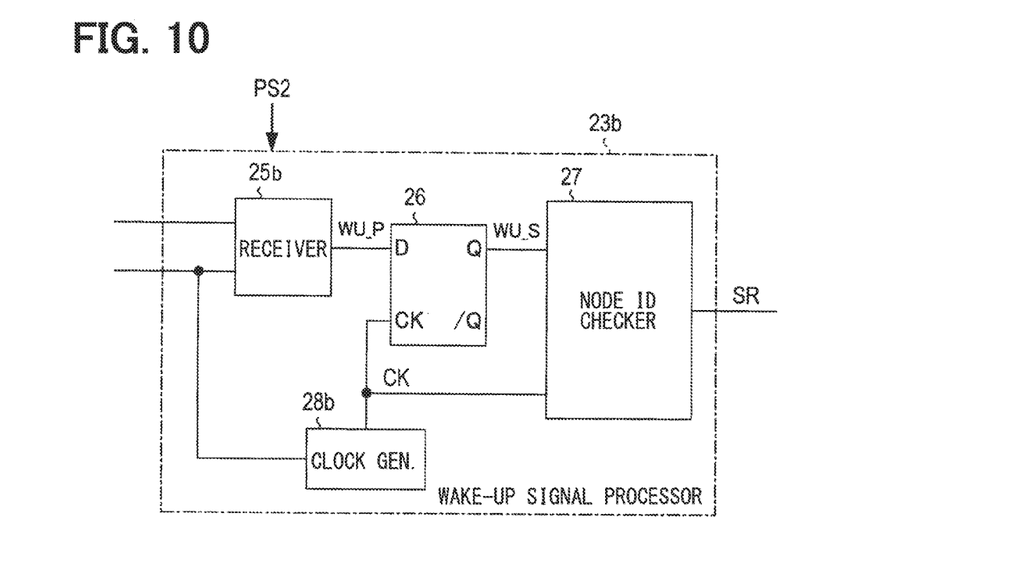
FIG. 10 is a block diagram of the wake-up signal receiver-processor n a third embodiment of the present disclosure.

A WU signal processor 23b of the present embodiment has the same configuration as the WU signal receiver-processor 23 of the first embodiment, except that a clock generator 28b generates the clock CK with reference to a received signal from the transmission line 5, as shown in FIG. 10.

Figure 11:
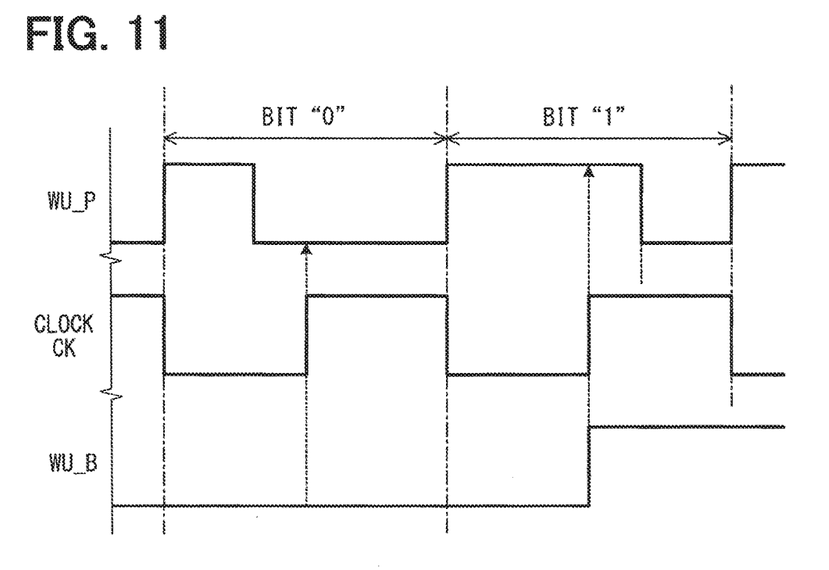
FIG. 11 is a timing chart of an operation of a sampler.

The clock generator 28b generates the clock CK, which is synchronized with the signal WU_P, based on the received signal, as shown in FIG. 11.

Thereby, in the sampler 26, by sampling the signal WU_P outputted from a receiver 25b at the center of each bit, the decoding and the sampling is performed simultaneously and the signal WU_S is directly generated from the signal WU_P.

[3.2. Effect]

According to the third embodiment described in full details above, the same effects as the first embodiment mentioned above are achievable.

[4. Other Embodiments]

Although the present disclosure has been described in connection with preferred embodiments thereof with reference to the accompanying drawings, it is to be noted that various changes and modifications will become apparent to those skilled in the art.

(1) According to the above-mentioned embodiments, the NRZ coding or the PWM coding is used for a transmission of the WU signal. However, different coding schemes may be usable for such purpose.

Figure 12A:
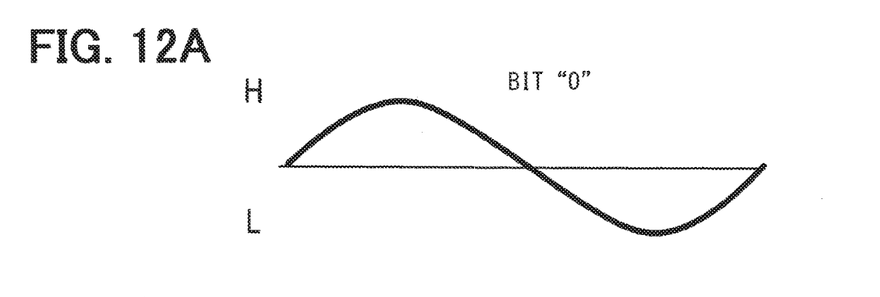
FIGS. 12A/B are wave form diagrams of a signal used for a coding of a wake-up signal in other embodiments of the present disclosure.
Figure 12B:
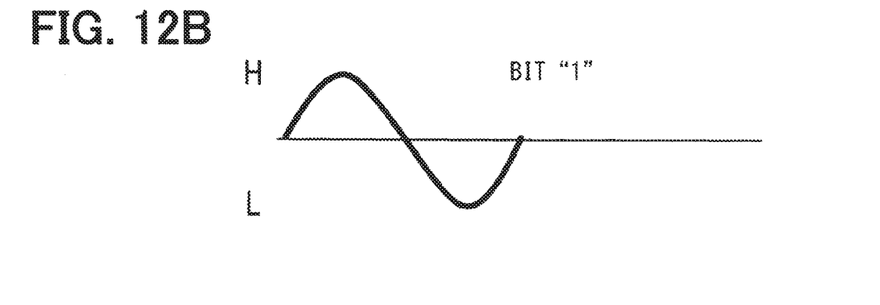

For example, as shown in FIGS. 12A/B, a Frequency-Shift Keying (FSK) by using mutually different two frequencies (i.e., frequency-shift modulation) may be used. In such case, the A/D converter 25 may be provided as a decoder for decoding a FSK coded signal.

(2) According to the above-mentioned embodiment, the wake-up controller 16 is configured to obtain the signal from the transmission line 5 via the WU signal filter 15. However, the WU signal filter 15 may be omissible when the network control device 1 is connected with a communications partner via 1 to 1 connection.

(3) For example, a function in one component in the above-described embodiments may be distributed to plural components, or a function realized by plural components in the above-described embodiments may be aggregated to only one component. Further, a part of the component in the above-described embodiments may be replaced with a well-known component having the same function. Further, the technique represented by the language of the claims may take various forms in a non-limiting manner.

(4) The present disclosure may also be realizable in various other forms (e.g., as a transmission method of the wake-up signal) other than the network control device and the system having such a network control device mentioned above.

Such changes, modifications, and summarized schemes are to be understood as being within the scope of the present disclosure as defined by appended claims.

What is claimed is:

1. An in-vehicle network control device to serve as a network device of an in-vehicle network system together with a transmission line to selectively operate in a wake-up mode, and in a sleep mode for a low power operation, the network control device comprising:

a communicator configured to perform communications at a preset transmission speed via the transmission line in the wake-up mode and to transmit a sleep instruction;

a low frequency attenuator configured to attenuate a low frequency component in a transmission signal having a low transmission speed lower than the preset transmission speed, the low frequency attenuator connected at a position between the transmission line and the communicator, and further configured to receive the transmission signal from the communicator and to transmit the transmission signal to the communicator;

a wake-up controller configured to receive the sleep instruction to transition the in-vehicle network control device to the sleep mode, to receive a wake-up requisite determination result to transition the in-vehicle network control device to the wake-up mode, to receive a signal detection result, and to transmit a wake-up signal to the transmission line, the wake-up controller connected to the low frequency attenuator at a transmission line side position of the low frequency attenuator, the wake-up controller including
a power supply controller configured to control a power supply,
a signal detector configured to receive the wake-up signal and to output the signal detection result to the power supply controller, and
a wake-up signal receiver processor configured to receive the wake-up signal and to output the wake-up requisite determination result; and
a wake-up signal filter configured to pass a low frequency component in the wake-up signal, the wake-up signal filter connected at a position between the transmission line and the low frequency attenuator, wherein
when the power supply controller receives the sleep instruction, the power supply controller provides power to the signal detector and cuts power to the communicator,
when the power supply controller receives the signal detection result, the power supply controller provides power to the wake-up signal receiver processor,
when the power supply controller receives the wake-up requisite determination result, the power supply controller provides power to the communicator and cuts power to the signal detector and the wake-up signal receiver processor, and
the wake-up signal received by the in-vehicle network control device is attenuated by the low frequency attenuator and passed by the wake-up signal filter.

2. The in-vehicle network control device of claim 1, wherein
the wake-up signal receiver processor includes:
an identification information storage configured to store self node identification information that identifies a self node for identifying an own device; and
an identification information checker configured to determine whether a wake-up is required, based on a comparison between (a) target node identification information in the received wake-up signal for identifying a target wake-up node and (b) the self node identification information,
wherein the wake-up requisite determination result is based on a determination result of the identification information checker.

3. The in-vehicle network control device of claim 2, wherein
the wake-up controller further includes:
a wake-up signal transmitter configured to transmit the wake-up signal according to an instruction from the communicator.

4. The in-vehicle network control device of claim 1, wherein
the wake-up signal undergoes a pulse-width modulation.

5. The in-vehicle network control device of claim 1, wherein
the wake-up signal undergoes a frequency-shift modulation.

6. An in-vehicle network control device comprising:
a communicator configured to perform communications at a preset transmission speed via a transmission line in a wake-up mode and to transmit a sleep instruction;
a low frequency attenuator configured to attenuate a low frequency component in a transmission signal having a low transmission speed lower than the preset transmission speed, the low frequency attenuator connected at a position between the transmission line and the communicator and further configured to receive the transmission signal from the communicator and to transmit the transmission signal to the communicator; and
a wake-up controller configured to receive the sleep instruction to transition the in-vehicle network control device to a sleep mode, to receive a wake-up requisite determination result to transition the in-vehicle network control device to the wake-up mode, to receive a signal detection result, and to transmit a wake-up signal to the transmission line, the wake-up controller connected to the low frequency attenuator at a transmission line side position of the low frequency attenuator, the wake-up controller including
a power supply controller configured to control a power supply,
a signal detector configured to receive the wake-up signal and to output the signal detection result to the power supply controller, and
a wake-up signal receiver processor configured to receive the wake-up signal and to output the wake-up requisite determination result, wherein
when the power supply controller receives the sleep instruction, the power supply controller provides power to the signal detector and cuts power to the communicator,
when the power supply controller receives the signal detection result, the power supply controller provides power to the wake-up signal receiver processor, and
when the power supply controller receives the wake-up requisite determination result, the power supply controller provides power to the communicator and cuts power to the signal detector and the wake-up signal receiver processor.

7. The in-vehicle network control device of claim 6, wherein
the wake-up signal receiver processor includes:
an identification information storage configured to store self node identification information that identifies a self node for identifying an own device; and
an identification information checker configured to determine whether a wake-up is required, based on a comparison between (a) target node identification information in the received wake-up signal for identifying a target wake-up node and (b) the self node identification information, wherein the wake-up requisite determination result is based on a determination result of the identification information checker.

8. The in-vehicle network control device of claim 7, wherein
the wake-up controller further includes:
a wake-up signal transmitter configured to transmit the wake-up signal according to an instruction from the communicator.

9. The in-vehicle network control device of claim 6, wherein
the wake-up signal undergoes a pulse-width modulation.

10. The in-vehicle network control device of claim 6, wherein
the wake-up signal undergoes a frequency-shift modulation.

* * * * *